Dec. 27, 1927.
C. P. DEIBEL
1,654,038
LINING FOR DRY CELLS
Original Filed Dec. 15, 1924
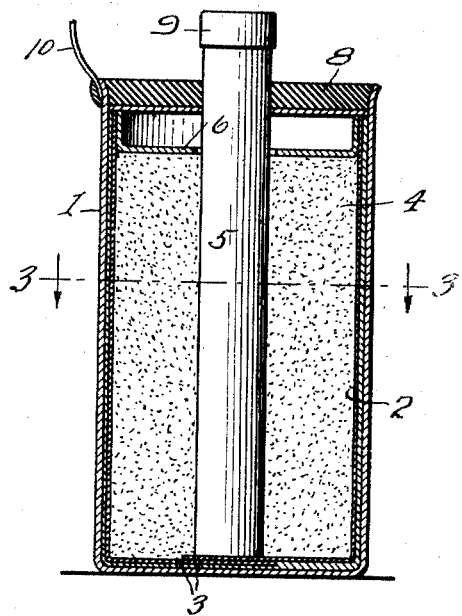
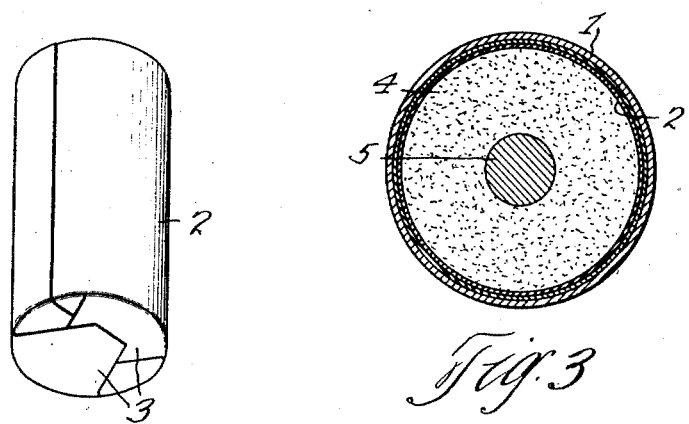
Inventor
Cyril P. Deibel
By Hull Brock West
Attorney Patented Dec. 27, 1927.

1,654,038

UNITED STATES PATENT OFFICE.

CYRIL P. DEIBEL, OF LAKEWOOD, OHIO, ASSIGNOR TO GENERAL DRY BATTERIES, INCORPORATED, OF CLEVELAND, OHIO, A CORPORATION OF OHIO.

LINING FOR DRY CELLS.

Original application filed December 15, 1924, Serial No. 755,878. Divided and application filed August 24, 1925, Serial No. 51,965. Divided and this application filed August 15, 1927. Serial No. 212,883.

This invention relates to improvements in the construction of dry cells and particularly to a very thin, tough, absorbent paper lining which is applicable to cells of practically all sizes, embracing those ranging from the smaller flashlight sizes to the standard six inch size. Among the flashlight sizes are cells that are being used extensively in the so-called "B" batteries of radio sets and it is to the construction of such batteries as these that my efforts are especially directed.

Flashlight cells, for example, those used in "B" batteries, are now generally made by molding a cake of mix about a carbon rod or pencil and wrapping the same in linen cloth about which a string is wound and tied to form what is referred to as the bobbin. This bobbin is then placed as nearly centrally as limited time and reasonable care will permit within a zinc cup, in the bottom of which there is usually a paper disk to keep the mix from contacting with the zinc bottom. This cell is known in the trade as the "bag type" cell.

A very common fault in cells of this construction is that the bobbin, being not centrally arranged in the cup, contacts with the side wall, thus rendering the cell internally defective, and one such cell in a "B" battery of fifteen cells causes the entire battery to be correspondingly defective. The battery as a whole is only as good as its weakest cell. Furthermore, when the bottom of the cup is covered by a paper disk, no use is obtained from the bottom and the life of the cell is proportionately shortened. Also, expensive low resistance materials have to be used in cells so made in order that the cell may properly function under heavy current drains. This is on account of the fact that the surface of the depolarizing mix is a considerable distance from the zinc electrode and the thick paste layer between the two surfaces causes a relatively high internal resistance.

Aside from these inherent defects, cells constructed as above set forth cannot be entirely reduced to automatic manufacture. The seriousness of this objection has been increased many fold since the advent of the radio. With the demand as it is today anything effecting an increase in production and a decrease in cost is enthusiastically welcomed by the industry.

The primary purpose of my invention is to so construct a dry cell that it may be made entirely by automatic machinery thus greatly increasing the volume, and reducing the cost of production and insuring a uniform high quality of product.

My improved cell is preferably, though not necessarily, constructed in accordance with the method set forth in U. S. Letters Patent No. 1,552,393, issued September 1, 1925, to Walter G. Waitt and myself and entitled Method of producing dry cells. This application is a division of application No. 51,965, filed August 24, 1925 and which in turn is a division of application No. 755,878, filed December 15, 1924, now Patent No. 1,552,396, issued September 1, 1925.

Further objects of my present invention are to provide a highly efficient yet comparatively inexpensive dry cell having a long shelf life as well as a long active life. Factors contributing to these results are the use of a maximum amount of mix in a cup of given size and the availability of the bottom of the cup as a part of the active agent or anode, no disk being required in the bottom of the cup according to my construction. I employ a cup lining of suitable absorbent paper, folded across the bottom of the cup in place of the usual paper disk. This insures against the mix contacting with the cup at any point, the paper being subsequently saturated with water or suitable electrolytic solution effectively establishes solution contact between the mix and the cup throughout the area of the sides and bottom of the mix. I highly compress the mix within the cup, thus allowing the use of more mix than would otherwise be possible. This compression of the mix also materially reduces internal resistance, permitting a cheaper grade of materials to be used than is practical were the mix not highly compressed. My cell is known in the trade as the "non-bag type" cell, as distinguished from the "bag type" cell hereinbefore referred to.

The dry battery industry developed the use of a chipboard or pulpboard lining between the zinc can and the depolarizing mix. This pulpboard lining serves a double purpose, first, that of an insulator and second, that of a porous diaphragm. As a solid insulator, it prevents the solid particles of carbon, graphite and oxide of manganese from making contact with the zinc and thus avoids internal short circuiting the cell. As a porous diaphragm it permits the soluble electrolyte of zinc chloride and sal ammoniac to pass freely from the mix to the zinc can and permits the diffusion of the soluble products of chemical action when the cell is discharging. The pulpboard developed by the dry battery industry for use as a lining is a mixture of ground wood and chemical wood pulp without sizing or waterproofing made on chipboard machines. The usual thickness when dry is from 20 to 40 thousandths of an inch thick.

In cells of the type disclosed in Patents 1,552,395 and 1,552,396 of Sept. 1, 1925, I have found that a lining of thin pliable paper instead of pulpboard produces cells of much lower internal resistance than cells previously made. This is because thinner paper permits a much thinner layer between mix and zinc than can be practically obtained with pulpboard lining. Furthermore, the thin pliable paper is very flexible and can be bent or folded over when dry without cracking, whereas the pulpboard is brittle and when dry cannot be folded over without cracking.

Furthermore my thin pliable paper is very absorbent, so much so, that it can be used dry when the cell is filled with depolarizing material and after filling it will take up sufficient solution quickly enough to make its use practical, whereas the pulpboard lining must be wet before the depolarizing mix is put into the cell, because of its less absorbent qualities. Pulpboard lining is from 20 to 40 thousandths of an inch thick and a double layer of my thin paper is only from 7 to 8 thousandths of an inch thick.

It will be seen therefore that by the use of thin, tough, pliable paper as a lining I have reduced the thickness of the lining about one third, and the result is a cell having much lower internal resistance. Furthermore more mix will be used in a cell of given size. These advantages produce a more efficient cell than heretofore known.

The objects above set forth, with others hereinafter appearing, are attained in the construction illustrated in the accompanying drawing wherein Fig. 1 is a central vertical section through my improved dry cell; Fig. 2 is a perspective view of the lining removed from the cell; and Fig. 3 is a transverse section on the line 3—3 of Fig. 1.

The cup, which is designated 1, is made of zinc or equivalent metal, and in those sizes of cells where such treatment of the metal is practical, the cup is drawn from a single sheet. This is a method employed in the production of flashlight sizes. The cup is provided with a thin, pliable lining 2 of suitable absorbent material. I preferably use for this purpose a very thin, pliable paper. Prior to forming the lining in the manner presently to be described, suitable flour or starch paste may be applied to the paper, preferably on one side only, and the paste and paper are allowed to thoroughly dry. The paper is then wound about a form in one or more layers to correspond in size and shape with the interior of the cup and at one end is folded inwardly, as shown at 3, to form a bottom.

After the lining is placed within the cup a cake 4 of suitable depolarizing mix, containing the cathode 5 in the form of a carbon rod or pencil, is inserted into the lined cup, and is highly compacted therewithin, the top surface of the mix, after the mix is compressed, being spaced a considerable distance below the top edge of the lining which, in turn, as will be observed from Fig. 1, is spaced a suitable distance from the open end of the cup. A dished washer 6 occupies the open end of the lining and rests upon the mix while its rim extends up alongside the extended portion of the lining, the lining and rim of the dished washer terminating in approximately the same plane.

Before fully depressing the dished washer into the cup, it is temporarily spaced from the mix and engaged only a slight distance within the lining. While the dished washer is in this position, a quantity of liquid, such as water or a suitable electrolytic solution, is poured into the cell and allowed to run down through the central hole of the washer about the cathode onto the mix and thoroughly saturate the paper lining, as well as the paste which is carried thereby, causing the paste and the paper to expand. The pores of the paper become filled with the liquid and this effects solution contact between the mix and the wall of the cup, this condition extending throughout the area of the sides and bottom of the cup. When the liquid is absorbed the washer is pressed down against the mix, as illustrated, and a washer 7 is placed within the cup and brought to bear upon the edge of the lining and the rim of the dished washer. This is followed by the introduction of a quantity of sealing material 8 sufficient to completely fill the cup. The battery is completed by the application of the usual metal cap 9 to the cathode and a terminal 10 to the cup, the latter being shown as consisting of a suitable conductor that is fastened to the cup by a quantity of solder or the like, shown at 11.

The use of paper of the kind described for the lining 2 enables the mix to be inserted and highly compressed without danger of injuring the paper and with the assurance that the mix will at no point come in contact with the wall or bottom of the cup. The space enclosed by the washers 6 and 7 constitutes the expansion chamber previously referred to which allows for expansion and contraction of air or other gases within the cup also as a reservoir for excess battery solution, without imposing such strains upon the sealing material as would be liable to rupture or loosen it.

I do not wish to limit the use of my improved lining to cells constructed in accordance with the method referred to, or to cells which have an expansion chamber as hereinbefore described; but desire it to be understood that my improved lining is one of general application and is adapted for use in all cells of the so-called dry or semi-dry type.

Having thus described my invention, what I claim is:—

1. A dry cell comprising a cup, a lining of one or more layers of thin, tough, pliable, absorbent paper-like material extending about the inner wall of the cup, a cake of depolarizing mix compressed within the lined cup, said lining being sufficiently strong to permit the cake of mix to be compressed within the lined cup without rupturing the lining and sufficiently porous to be used dry in the first instance and yet be capable of absorbing the required amount of electrolytic solution.

2. A dry cell comprising a zinc container having its active surface covered with a thin, tough, pliable paper not more than ten thousandths of an inch in thickness.

3. In a dry cell, the combination of an inner electrode, an outer zinc electrode, and a mass of depolarizing mix, and a lining consisting of one or more layers of thin unsized, pliable paper applied to the active surface of said outer electrode, the thickness of the lining being not more than ten thousandths of an inch.

In testimony whereof, I hereunto affix my signature.

CYRIL P. DEIBEL.